June 30, 1931.  A. R. SMITH  1,812,453
AUTOMOBILE LOCK
Filed Aug. 7, 1928

Inventor
ANTHONY R. SMITH
By Richey + Watts
Attorney

Patented June 30, 1931

1,812,453

UNITED STATES PATENT OFFICE

ANTHONY R. SMITH, OF ELYRIA, OHIO, ASSIGNOR TO STEEL AND TUBES, INC., OF CLEVELAND, OHIO, A CORPORATION OF OHIO

AUTOMOBILE LOCK

Application filed August 7, 1928. Serial No. 297,968.

This invention relates to an improved locking device for the transmission mechanism of power devices. More particularly it relates to an improved construction of gear shift levers of the type which can be locked to prevent manipulation of a gear shift element.

It is advantageous to construct gear shift levers so that a portion thereof can alternatively be operatively engaged with or disengaged from a gear shift element and the portion locked in its disengaged position to prevent manipulation of the gear shift element. It is further desirable to normally cause the said portion of the gear shift lever to be automatically forced into engagement with the gear shift element and be automatically latched in this position.

It is an object of this invention to provide an improved construction of gear shift lever whereby the locking device therefor is operated from within the lever into locked engagement therewith.

It is a further object to provide a gear shift lever in which a portion thereof is normally forced into operative engagement with a gear shift element and automatically latched in this position.

Other objects will be apparent from the specification and from the accompanying drawings in which latter:

Figure 1:
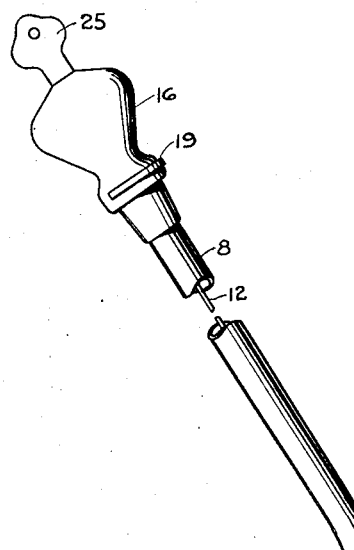
Fig. 1 is a side elevation partly in section of a device embodying my invention.
Figures 2, 3:
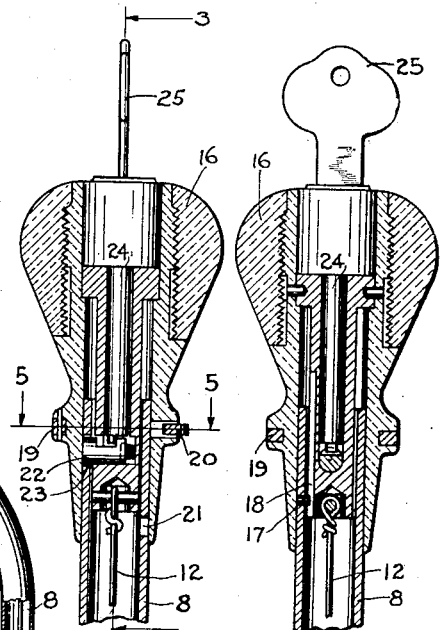
Fig. 2 is a longitudinal sectional view of the upper part of the lever showing the handle in withdrawn and locked position.
Fig. 3 is a longitudinal sectional view of the upper portion of the lever showing the handle in withdrawn position and showing the slot and key guide mechanism.

Referring particularly to the drawings, in its preferred embodiment the device comprises a housing 1 adapted in its lower portion to fit on the gear case of an automobile, the upper portion being restricted and more or less circularly formed and provided with an inwardly extending flange 2 suitably shaped to receive the ball-like member 3 of a ball and socket joint or pivot. This member 3 is held in place on the flange 2 by a coil spring 4 resting thereon and bearing against a top cap 5 which is also preferably curved to correspond with the curvature of the lower surface of the member 3 and which is held in place by a suitably shaped retainer 6 pinned to the housing 1 by pins 7. Preferably the pins 7 project inwardly beyond the retainer 6 and seat in grooves in member 3 in a manner to permit ball and socket movement of the member 3 while preventing turning of the latter in a plane parallel to the flange 2. A gear shift lever 8 is secured to the member 3 by a pin 9 which passes through the lever 8 and seats at either end in the member 3.

Figure 4:
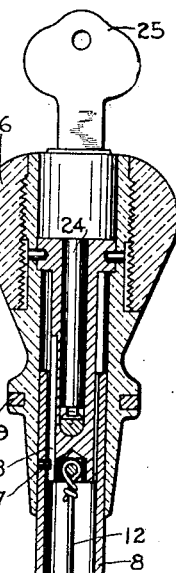
Fig. 4 is a longitudinal sectional view of the upper portion of the lever showing the handle in its lower position and the latching device in operative position.
Figure 7:
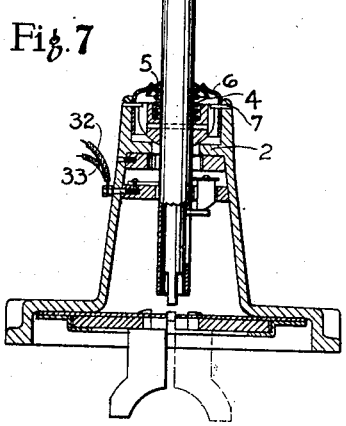
Fig. 7 is a section on line 7—7 of Figure 1.
Figure 5:
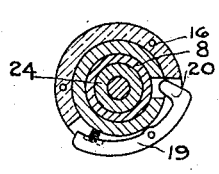
Fig. 5 is a transverse sectional view taken along the line 5—5 of Fig. 2 showing the latching device in inoperative position.
Figure 6:
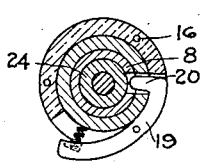
Fig. 6 is a transverse sectional view taken along the line 6—6 of Fig. 4 showing the latch in operative position.

An assembly is disposed within and extends through the lever 8 and is movable longitudinally thereof for the purpose of engagement with and disengagement from a gear shift element 10. The assembly comprises at its lower end a gear shift element engaging member 11 which is connected to a wire or other connecting member 12 which extends through and within the lever. A spring 13 normally maintains the member 11 in engagement with the gear shift element by pressing against the pin 9 at one end and at its opposite end bearing against the element 11. The wire 12 is connected at the upper end of the lever to a handle 16 which is provided with a longitudinally extending tubular slot adapted to receive the end of the lever for longitudinal sliding engagement therewith. A key 17 projecting inwardly from the lever has sliding engagement in a keyway 18 formed in the portion of the handle which is normally disposed within the lever. The spring 13 normally forces the assembly, including the handle, longitudinally downwardly of the lever into the position illustrated in Fig. 4. The handle is latched in this position automatically by means of a latch 19 which is pivotally carried by the handle and has an arm 20 which is normally spring pressed against the lever and into engagement with an opening 21 in the lever.

The handle can be manually withdrawn longitudinally of the lever and is locked in withdrawn position by means of a pin 22 carried by the inner portion of the handle and adapted to be moved laterally into engagement with a slot 23 in the handle. The cam pin is actuated by means of a cam lever 24 which in turn is actuated by a locking device manipulated by a key 25.

It will be noted that means are provided indicated at 30 and 31 which can be actuated by an arm on the member 11 for breaking the ignition circuit coming through the conduits 32 and 33 when the assembly is moved to its withdrawn position.

In utilizing the device the handle 16 is moved manually longitudinally of the lever into withdrawn position thereby removing the member 11 from engagement with the gear shift element. The key 25 is then turned to lock the cam pin 22 into engagement with the lever. When it is desired to utilize the gear shift lever the cam pin 22 is turned into unlocked position by the key 25 whereupon the force of the spring 13 normally forces the assembly longitudinally of the lever into operative engagement with the gear shift element in which position the transversely extending latch 19 is automatically forced into the slot 21 of the lever thereby securing the assembly in its operative position.

While a specific embodiment of the invention has been shown and described it will be apparent that modifications can be made therein within the spirit and scope of the invention and such modifications are intended to be covered by the appended claims.

I claim:

1. A transmission locking device comprising a shift lever, an assembly movable longitudinally of the lever to engage with and be withdrawn from a gear shift element, means for normally forcing the assembly longitudinally of the lever into position for operative engagement with the gear shift element, and a latch operative to automatically secure the assembly longitudinally with respect to the lever in the last mentioned position.

2. A transmission locking device comprising a shift lever, an assembly movable longitudinally of the lever to engage with and be withdrawn from a gear shift element, means for normally forcing the assembly longitudinally of the lever into operative engagement with the shift element, and a key controlled lock in the assembly including means for securing the lever and assembly relatively when the latter is moved longitudinally of the lever into withdrawn position with respect to the gear shift element.

3. A transmission locking device comprising a shift lever, an assembly movable longitudinally of the lever to engage with and be withdrawn from a gear shift element, a key controlled lock in the assembly adapted to secure the lever and assembly relatively when the latter is moved longitudinally of the lever into withdrawn position, and means to automatically secure the assembly and lever relatively when the assembly is moved longitudinally of the lever into engagement with the gear shift element.

4. A transmission locking device comprising a shift lever, an assembly movable longitudinally of the lever to engage with and be withdrawn from a gear shift element, means for normally forcing the assembly longitudinally of the lever into operative engagement with the shift element, means to automatically secure the assembly and lever relatively when in the last mentioned position, and a key controlled lock in the assembly to secure the lever and assembly relatively when the latter is moved longitudinally of the lever into withdrawn position.

5. A transmission locking device comprising a shift lever, an assembly movable longitudinally of the lever to engage with and be withdrawn from a gear shift element, means for normally forcing the assembly longitudinally of the lever into operative engagement with the shift element, and a key controlled lock in the assembly to secure the lever and assembly relatively in adjusted position.

6. A transmission locking device comprising a shift lever, an assembly movable longitudinally of the lever to engage with and be withdrawn from a gear shift element, means for normally forcing the assembly longitudinally of the lever into position for operative engagement with the shift element, and a latch operative to automatically secure the assembly with respect to the lever in adjusted position.

7. A transmission locking device comprising a tubular shift lever, an assembly including a handle movable longitudinally of the lever to engage with and be withdrawn from a gear shift element, and a key controlled lock including means operable to secure the handle and lever relatively in adjusted position from within the lever.

8. A transmission locking device comprising a shift lever, an assembly including a handle movable longitudinally of the lever to engage with and be withdrawn from a gear shift element, the handle having a slot to receive the end of the shift lever, and a key controlled lock including a member operable to project from the portion of the handle within the lever into engagement with the lever to lock the same.

9. A transmission locking device comprising a shift lever, an assembly movable longitudinally of the lever to engage with and be withdrawn from a gear shift element, means for normally forcing the assembly longitudinally of the lever into operative engagement with the shift element, means manually releasable exteriorly of the lever for automatically securing the assembly and lever relatively when the assembly is moved longitudinally of the lever into engagement with the gear shift element, and a key controlled lock to secure the assembly and lever relatively in adjusted position.

10. A transmission locking device comprising a tubular shift lever, an assembly movable longitudinally of the lever to engage with and be withdrawn from a gear shift element, the assembly including a handle having a tubular slot which adjustably receives the end of the lever, and a key controlled lock operable to lock the portion of the handle enclosed by the lever into fixed relation longitudinally with respect thereto.

11. A transmission locking device comprising a tubular shift lever, an assembly movable longitudinally within the lever to engage with and be withdrawn from a gear shift element, means for normally forcing the assembly longitudinally of the lever into operative engagement with the shift element, the assembly including a handle having a tubular slot therein which receives the end of the lever, and a key controlled lock operable to secure the portion of the handle enclosed by the lever in fixed relation to the lever when the assembly is in withdrawn position.

12. A transmission locking device comprising a shift lever, an assembly movable longitudinally of the lever to engage with and be withdrawn from a gear shift element, means for normally forcing the assembly longitudinally of the lever into position for operative engagement with the gear shift element, and a latch extending transversely of the lever operative to automatically secure the assembly longitudinally with respect to the lever in the last mentioned position.

In testimony whereof I hereunto affix my signature this 6th day of August, 1928.

ANTHONY R. SMITH.